United States Patent [19]

Mitani et al.

[11] Patent Number: 5,724,182
[45] Date of Patent: Mar. 3, 1998

[54] OPTICAL SHEET AND A LIGHT TRANSMISSION SCREEN USING THE SAME

[75] Inventors: Katsuaki Mitani, Ibaraki; Hirokazu Sakaguchi, Toyonaka; Satoshi Aoki, Kadoma, all of Japan

[73] Assignee: Matsushita Electric Industrial Co., Ltd., Osaka, Japan

[21] Appl. No.: 616,166

[22] Filed: Mar. 14, 1996

[30] Foreign Application Priority Data

Mar. 23, 1995 [JP] Japan ................... 7-064044

[51] Int. Cl.⁶ .................................. G03B 21/60
[52] U.S. Cl. ................ 359/457; 359/455; 359/460
[58] Field of Search ........................ 359/443, 453, 359/457, 455, 456, 460

[56] References Cited

U.S. PATENT DOCUMENTS

| | | |
|---|---|---|
| 4,165,153 | 8/1979 | Land. |
| 4,721,361 | 1/1988 | Van De Ven .................. 350/128 |
| 5,400,114 | 3/1995 | Yoshida et al. ................ 359/457 |
| 5,485,308 | 1/1996 | Hirata et al. .................. 359/457 |

FOREIGN PATENT DOCUMENTS

| | | |
|---|---|---|
| 5-265095 | 10/1993 | Japan. |
| 5-289176 | 11/1993 | Japan. |
| 5-289179 | 11/1993 | Japan. |
| 6-102499 | 4/1994 | Japan. |
| 6-160982 | 6/1994 | Japan. |
| 6-250001 | 9/1994 | Japan. |

OTHER PUBLICATIONS

European Search Report dated Jul. 19, 1996.

*Primary Examiner*—Daniel P. Malley
*Attorney, Agent, or Firm*—Ratner & Prestia

[57] ABSTRACT

The present invention provides a bright light transmission screen and light diffusion panel. An antireflective film is disposed on the surface of a lenticular lens sheet substrate included in a light transmission screen. The antireflective film is made from a high polymer compound of a low refractory index and has a thickness that is different from $\lambda/(4n)$. The antireflective film may also be disposed on a Fresnel lens sheet substrate or a light diffusion panel substrate.

18 Claims, 11 Drawing Sheets

OPTICAL SHEET AND A LIGHT TRANSMISSION SCREEN USING THE SAME

BACKGROUND OF THE INVENTION

The present invention relates to an optical sheet such as a lens sheet, a light diffusion panel and the like, which is used in an image display apparatus, and a light transmission screen using the same.

A light transmission screen of a projection type TV receiver and a light diffusion panel of a liquid crystal display traditionally have an antireflective film disposed on the surface of a lens sheet and a panel used in these devices.

In general, the material and thickness of the antireflective film have been determined according to the light interference theory. FIG. 10 illustrates the fundamental phenomena involved with an antireflective film according to the light interference theory. In FIG. 10, an antireflective film 106 is disposed on the surface of a plane substrate 107. The refractive indexes of the plane substrate 107, the antireflective film 106 and the medium 105 at the light incident side, namely air, are defined as $N_2$, $N$ and $N_1$, respectively. The reflective light of the incident light 100 comprises the upper surface reflected light 101 produced at the boundary plane between the air 105 and the antireflective film 106 and the lower surface reflected light 102 produced at the boundary plane between the antireflective film 106 and the plane substrate 107. In order for the light intensity 103 of the upper surface reflected light 101 to cancel completely the light intensity 104 of the lower surface reflected light 102, the light intensity 103 of the upper surface reflected light needs to be equal to the light intensity 104 of the lower surface reflected light.

For that purpose, the ratios between the refractive indexes at each respective boundary plane have to be equal to each other. In other words, the relation expressed by $(N_1/N)=(N/N_2)$ has to be satisfied. Since the refractory index of air $(N_1)$ is '1', the following equation (1) is established:

$$N = \sqrt{N_2} \quad (1)$$

This means that the refractory index of the antireflective film 106 must satisfy the equation (1).

Besides, some of the incident light 100 is reflected at the upper surface as well as the lower surface of the antireflective film 106, and these reflections take place in a medium which shows a lower refractory index than the refractory indexes of the neighboring media. Accordingly, in order for those two reflective light rays to cancel each other by light interference, the relative shifting in position of these reflective light rays should be made equal to 180°. More specifically, when the total phase difference between these two reflective light rays corresponds to twice the ¼ wavelength (namely 180°), the thickness (d) of the antireflective film should satisfy an equation (2) as follows:

$$d = (\lambda \times 1)/(4 \times N) \quad (2)$$

where ($\lambda$) is the wavelength of light.

Accordingly, the simplest antireflective film has a refractory index which is equal to the square root of the substrate's refractory index $N_2$, and also a film thickness that is equal to 1/(4N) of the wavelength of the light used. However, since there are no materials that have refractory indexes corresponding to the square root of the substrate's refractory index, materials with refractory indexes closest to the above theoretical value are being used.

A few prior art examples of the antireflective films based on the foregoing light interference theory were proposed in the Published Unexamined Patent Application Nos. 265095/93, 289179/93 and 289176/93.

Published Unexamined Patent Application No. 265095/93 discloses that the thickness of an antireflective film disposed on the surface of a lens sheet is limited to a range of 125 nm to 150 nm, satisfying the foregoing equation (2).

In addition, Published Unexamined Patent Application Nos. 289176/93 and 289179/93, disclose antireflective films with film thicknesses, which satisfy the equation (2) derived from the light interference theory, are disposed on the surfaces of lens sheets.

However, each respective Fresnel lens sheet or lenticular lens sheet that forms a light transmission screen includes a plurality of lenses.

With a lenticular lens sheet covered by an antireflective film of the film thickness ($\lambda/4N$) derived from the light interference theory applicable to a plane surface, only the light hitting the center of the lenticular lens passes through the length that corresponds to the film thickness derived from the light interference theory. The light and the light both passing through areas other than the center of the lenticular lens and travels oblique lengths that differ from the length which was derived from the light interference theory. As a result, the mount of the light passing through the film thickness derived from the light interference theory tends to be extremely small. Therefore, a sufficient antireflective effect can not be realized with a lens sheet covered by an antireflective film having a film thickness determined according to the light interference theory.

Also, where an antireflective film is disposed on the surface of the Fresnel lens sheet substrate comprising a plurality of Fresnel lenses, the vertically incident light passes through the antireflective film in an obliquedirection, and does not travel the length that is equivalent to the antireflective film thickness as derived from the light interference theory. In other words, a predominant part of the light passes through a length that differs from what was derived from the light interference theory.

Accordingly, the equation (2), which applies to a planar plate with a flat surface according to the light interference theory, does not hold true with a lenticular lens sheet and Fresnel lens sheet both comprised of a plurality of lenses. As a result, there has been a problem that a sufficient antireflection effect is not achieved.

The object of the optical sheet as disclosed by the present invention is to provide a lens sheet, light diffusion panel and the like that have improved antireflective effects.

SUMMARY OF THE INVENTION

An optical sheet of the present invention comprises a sheet substrate with a plurality of projections and depressions, and an antireflective film disposed on the surface of the sheet substrate. The refractory index of the antireflective film is smaller than that of the sheet substrate. Further, the thickness of the antireflective film is different from ($\lambda/4n$) derived by calculation from the light interference theory, where ($\lambda$) is the wavelength of light in the visible region (approximately from 400 nm to 700 nm) and (n) is the refractory index of the foregoing antireflective film. The above structures make it possible to achieve a better antireflective effect when compared with an optical sheet comprising an antireflective film with a thickness derived from the light interference theory. As a result, the light transmissivity is much improved and reflections of the ambient light are greatly reduced.

The sheet substrate with a plurality of projections and depressions can be used a lenticular lens substrate with a plurality of lenticular lenses, a Fresnel lens base material with a plurality of Fresnel lenses or a light diffusion panel with a plurality of projections and depressions.

It is possible for a light transmission screen to improve the screen brightness and reduce reflections of the ambient light on the screen surface markedly on account of enhanced light transmissivity by having the light transmission screen composed of the foregoing lenticular lens sheet, Fresnel lens sheet or light diffusion panel.

KEY TO REFERENCE NUMERALS

Figure 1:
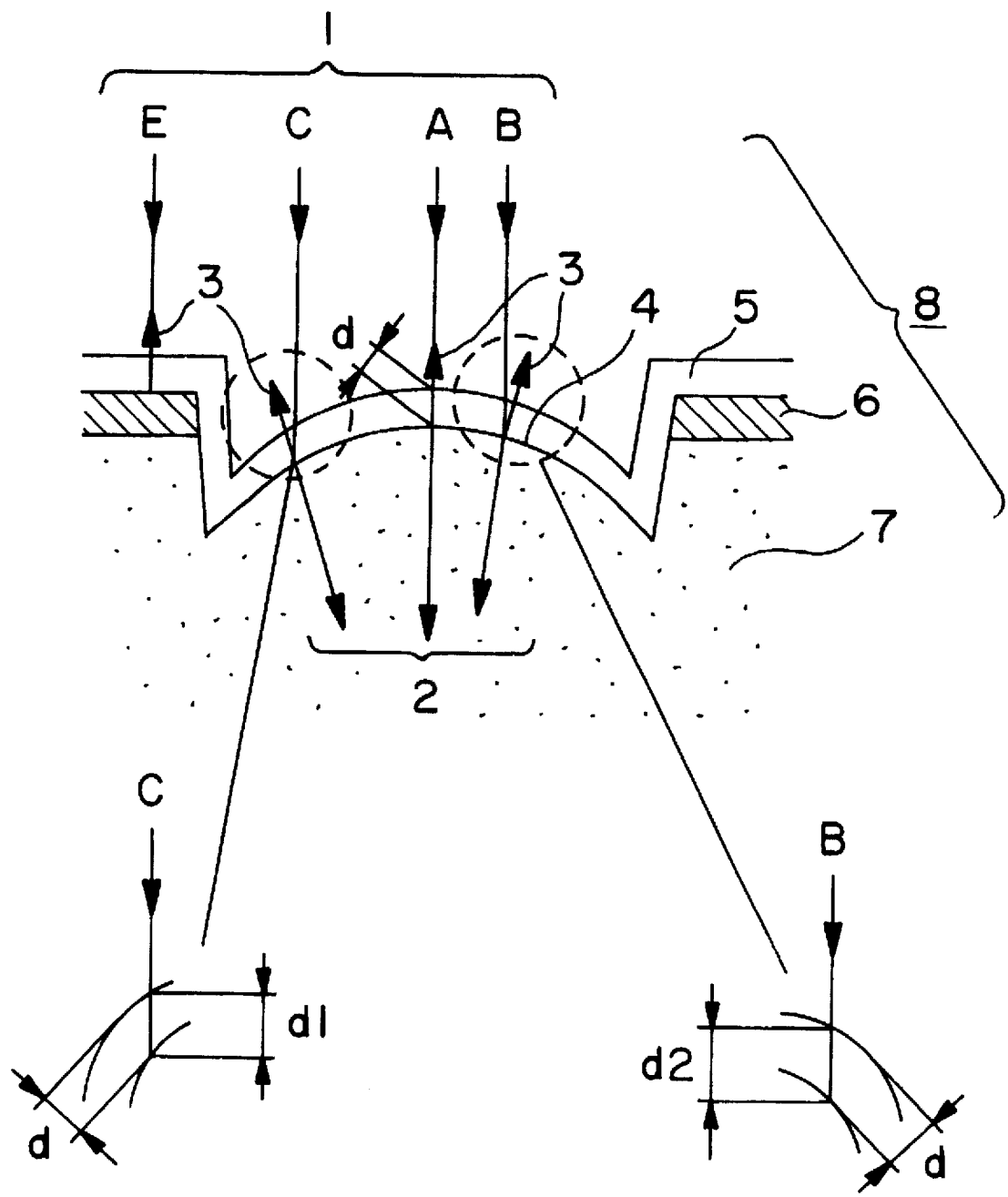
FIG. 1 is a cross-sectional view of a portion of a lenticular lens sheet in an exemplary embodiment of the optical sheet of the present invention.

1 Vertically Incident Light
2 Transmissive Light
3 Reflective Light
4 Lenticular Lens
5 Antireflective Film
6 Black Stripe
7 Lenticular Lens Sheet Substrate
8 Lenticular Lens Sheet
10 Vertically Incident Light
11 Transmissive Light
21 Fresnel Lens Sheet
22 Lenticular Lens Sheet Substrate
23 Black Stripe
24 Light Incident Side Lens
25 Light Radiant Side Lens
26 Fresnel Lens
27 Antireflective Film
28 Incident Light from CRT
29 Radiant Light
30 Incident Light from Ambiance
31 Reflected Light of Ambient Light
32 Reflection of Incident Light from CRT
33 Vertical Light
35 Lenticular Lens Sheet
51 Fresnel Lens Sheet Substrate
52 Antireflective Film
53 Fresnel Lens
55 Fresnel Lens Sheet
60 Light Transmission Screen
82 Light Diffusion Panel Substrate
83 Antireflective Film
84 Light Diffusion Panel
85 Surface with Projections and Depressions
86 Incident Light
87 Transmissive Light
89 Light Diffusing Powder
100 Vertically Incident Light
101 Upper Surface Reflection of Antireflective Film
102 Lower Surface Reflection of Antireflective Film
103 Light Intensity of Upper Surface Reflection of Antireflective Film
104 Light Intensity of Lower Surface Reflection of Antireflective Film
105 Medium at Incident Light Side (Usually Air)
106 Antireflective Film
107 Planar Substrate with Flat Surface
201 Fresnel Lens Sheet Substrate
202 Antireflective Film
203 Fresnel Lens Sheet
204 Lenticular Lens Sheet Substrate
205 Antireflective Film
206 Lenticular Lens Sheet
207 Light Diffusion Panel Substrate
208 Antireflective Film
209 Light Diffusion Panel
211 Light Transmission Screen
d Thickness of Antireflective Film Determined by Light Interference Theory
d1 Thickness of Antireflective Film Determined Not by Light Interference Theory
d2 Thickness of Antireflective Film Determined Not by Light Interference Theory
d3 Thickness of Antireflective Film Determined Not by Light Interference Theory d5 Thickness of Antireflective Film Determined Not by Light Interference Theory x0 Measured Reflectance of Lenticular Lens Sheet x Measured Reflectance of Lenticular Lens Sheet Disposed with Reflective Film of 0.10 μm Thick x1 Measured Reflectance of Lenticular Lens Sheet Disposed with Reflective Film of 0.05 μm Thick x2 Measured Reflections of Lenticular Lens Sheet Disposed with Reflective Film of 0.07 μm Thick x3 Measured Reflectance of Lenticular Lens Sheet Disposed with Reflective Film of 0.125 μm Thick x4 Measured Reflectance of Lenticular Lens Sheet Disposed with Reflective Film of 0.150 μm x5 Measured Reflectance of Lenticular Lens Sheet Disposed with Reflective Film of 0.210 μm Thick x6 Measured Reflectance of Lenticular Lens Sheet Disposed with Reflective Film of 0.250 μm Thick x7 Measured Reflectance of Lenticular Lens Sheet Disposed with Reflective Film of 0.300 μm Thick y Antireflective Effect Curve Showing Relationship between Film Thickness and Reflectance at 550 nm, Center of Visible Wavelength F0 Theoretical Reflectance of Flat Substrate of Acrylic Resin F Theoretical Reflectance of Plate Composed of Acrylic Resin Made Flat Substrate and Reflective Film of 0.1 μm Thick Disposed on Substrate Surface F1 Theoretical Reflectance of Plate Composed of Acrylic Resin Made Flat Substrate and Reflective Film of 0.05 μm Thick Disposed on Substrate Surface F2 Theoretical Reflectance of Plate Composed of Acrylic Resin Made Flat Substrate and Reflective Film of 0.07 μm Thick Disposed on Substrate Surface F3 Theoretical Reflectance of Plate Composed of Acrylic Resin Made Flat Substrate and Reflective Film of 0.125 μm Thick Disposed on Substrate Surface F4 Theoretical Reflectance of Plate Composed of Acrylic Resin Made Flat Substrate and Reflective Film of 0.150 μm Thick Disposed on Substrate Surface F5 Theoretical Reflectance of Plate Composed of Acrylic Resin Made Flat Substrate and Reflective Film of 0.210 μm thick Disposed on Substrate Surface F6 Theoretical Reflectance of Plate Composed of Acrylic Resin Made Flat Substrate and Reflective Film of 0.250 μm Thick Disposed on Substrate Surface G0 Measured Reflectance of Plate Composed of Acrylic Resin Made Flat Substrate G Measured Reflectance of Plate Composed of Scrylic Resin Made Flat Substrate and Reflective Film of 0.1 μm Thick Disposed on Substrate Surface G1 Measured Reflectance of Plate Composed of Acrylic Resin Made Flat Substrate and Reflective Film of 0.05 μm Thick Disposed on Substrate Surface G2 Measured Reflectance of Plate Composed of Acrylic Resin Made Flat Substrate and Reflective Film of 0.07 μm Thick Disposed on Substrate Surface G3 Measured Reflectance of Plate Composed of Acrylic Resin Made Flat Substrate and Reflective Film of 0.125 μm Thick Disposed on Substrate Surface G4 Measured Reflectance of Plate Composed of Acrylic Resin Made Flat Substrate and Reflective Film of 0.150 μm Thick Disposed on Substrate Surface G5 Measured Reflectance of Plate Composed of Acrylic Resin Made Flat Substrate and Reflective Film of 0.210 μm Thick Disposed on Substrate Surface G6 Measured Reflectance of Plate Composed of Acrylic Resin Made Flat Substrate and Reflective Film of 0.250 μm Thick Disposed on Substrate Surface

DETAILED DESCRIPTION OF THE INVENTION

Exemplary embodiments of an optical sheet of the present invention and a light transmission screen using the same will be explained with reference to the drawings.

EXAMPLE 1

FIG. 1 is a cross-sectional view of a portion of a lenticular lens sheet in an exemplary embodiment of the optical sheet of the present invention. In FIG. 1, a lenticular lens sheet 8 is comprised of a lenticular lens sheet substrate 7 and an antireflective film 5 disposed on the lenticular lens sheet substrate 7. The lenticular lens sheet substrate 7 has a plurality of lenticular lenses 4 and flat black stripes 6. The antireflective film 5 is formed on the lenticular lens sheet substrate 7 to a desirable thickness. The refractive index ($n_1$) of the antireflective film 5 is made smaller than the refractive index of the material that constitutes the lenticular lens sheet substrate 7. The thickness of the antireflective film 5 is made to range from $1.2\lambda/(4n_1)$ to $(5\lambda)/(4n_1)$, wherein ($\lambda$) is the wavelength of light in the visible region (about 400 nm to 700 nm).

As illustrated in FIG. 1, the vertically incident light 1 is split to transmissive light 2 and reflective light 3 when an antireflective film 5 is formed on the surface of the lenticular lens 4. At this time, the reflective light 3 is reduced greatly by a light interference effect caused by the refractive index of the antireflective film 5 being smaller than that of the lenticular lens sheet substrate 7.

In the past, the optimal film thickness of an antireflective film due to the light inference effect was considered to be the film thickness derived by calculation from the light interference theory applicable to a planar plate, that is $\lambda/(4n_1)$.

However, in the case of a lenticular lens sheet substrate 7 comprising a plurality of lenticular lenses 4, a film thickness according to the light interference theory does not necessarily provide the optimal film thickness.

The optimal film thickness of a light reflective film as applied to a lenticular lens sheet 8 with a plurality of projections and recessions (i.e., a plurality of lenses) formed on the surface thereof will be discussed below.

In FIG. 1, when a light reflective film with a theoretical film thickness ($\lambda/(4n_1)$) as derived from the light interference theory is formed on the surface of a lenticular lens sheet substrate 7, only the light (A) incident on the center of the lenticular lens 4 out of the vertically incident light 1 and the light (E) incident on the flat part of the black stripe 6 pass through the antireflective film 5 vertically, and the distance that the light passes in the light reflective film 5 is equal to the theoretical film thickness (d) derived from the light interference theory. On the other hand, the light (B) and the light (C) incident on the lenticular lens 4 at places other than the center thereof pass through the light reflective film 5 obliquely, and the distance that each respective light passes through the reflective film 5 is not equal to the theoretical film thickness derived from the light interference theory.

In other words, the light (B) travels the distance (d2) that is different from the distance derived from the light interference theory, and the light (C) travels the distance (d1) that is different from the distance derived from the light interference theory. As a result, the maximum antireflective effect can not be achieved.

An antireflective film with a film thickness, which is different from that derived from the light interference theory, is disposed on the surface of a lens sheet substrate with a plurality of lenses by utilizing the optical sheet of the present invention, thereby achieving an excellent antireflective effect.

The optimal film thickness for antireflective film realized by the optical sheet of the present invention will now be explained.

Figure 4:
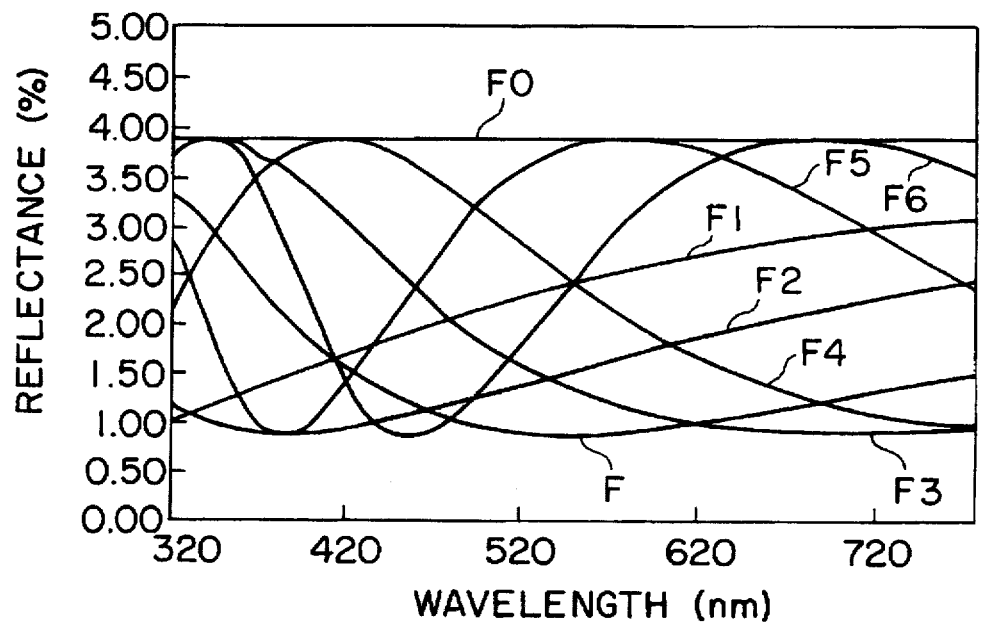
FIG. 4 is a graph showing the theoretical reflectance when antireflective films of various thickness' are disposed on a planar plate with a flat surface.

FIG. 4 shows curves of theoretical reflectance derived by calculation for light wavelengths within the visible region when antireflective films of various thicknesses are disposed on a planar plate with a flat surface made of acrylic resin having a refractive index of 1.49. The thickness of the acrylic resin plate is about 1 mm. The antireflective film used is a polymeric material sold under the brand name CYTOP by Asahi Glass. The CYTOP brand antireflective film has a refractive index of 1.34.

In FIG. 4, the reflectance curve F0 of the planar plate of acrylic resin shows an almost flat curve of about 3.9% over the visible wavelength region (400 nm to 700 nm). When the film thickness of the antireflective film is changed to 0.05 µm (F1), 0.07 µm (F2), 0.1 µm (F), 0.125 µm (F3), 0.15 µm (F4), 0.21 µm (F5) and 0.25 µm (F6), respectively, the theoretically calculated film thickness of 0.1 µm (F) shows the smallest reflectance over the entire range of the visible wavelength region.

Figure 5:
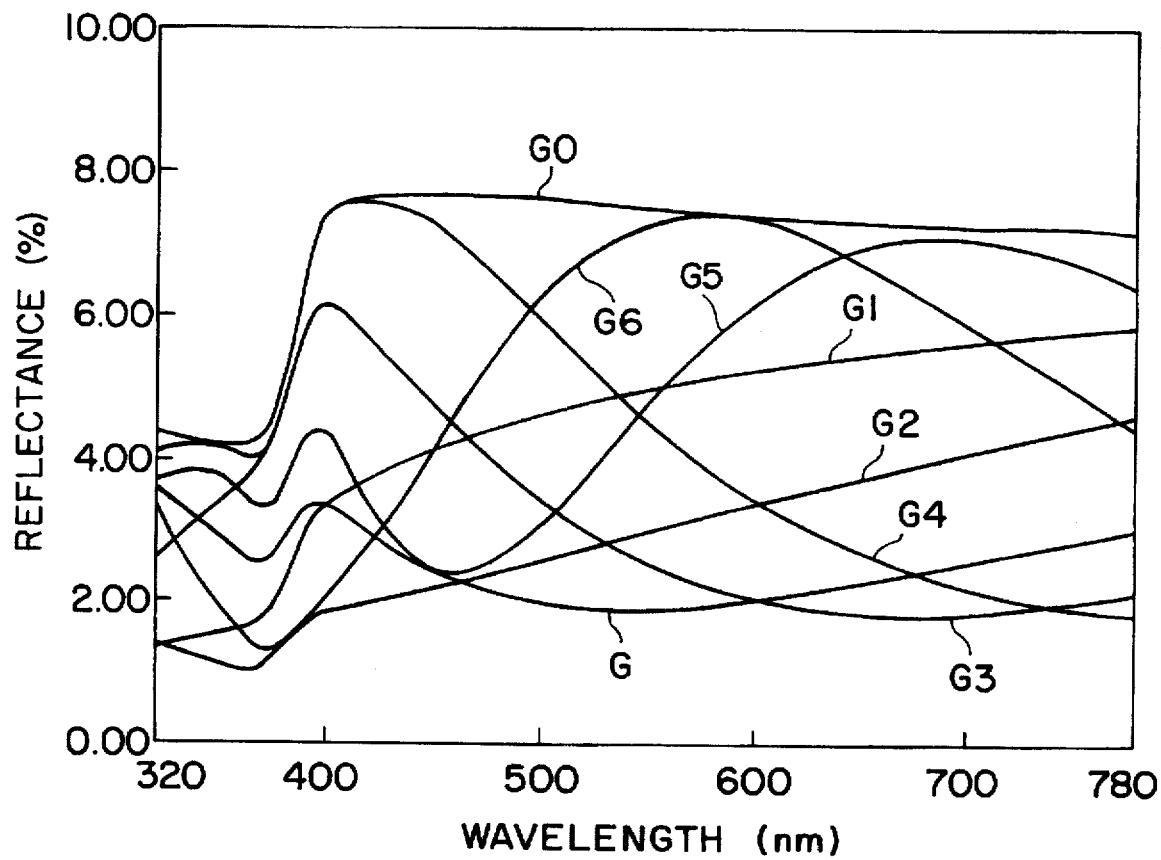
FIG. 5 is a graph showing the measured reflectance when antireflective films of various thicknesses are disposed on a planar plate with a flat surface.

FIG. 5 shows the actual measured reflectance of the sheets, wherein antireflective films with various film thicknesses are disposed on a flat surfaced planar plate made of acrylic resin. The acrylic resin plate is about 1 mm thick.

In FIG. 5, the reflectance curve (G0) corresponds to the planar plate of acrylic resin, the reflectance curve (G1) corresponds to the sheet disposed with a reflective film of 0.05 µm thick, the reflectance curve (G2) corresponds to the sheet disposed with a reflective film of 0.07 µm thick, the reflectance curve (G3) corresponds to the sheet disposed with a reflective film of 0.125 µm thick, the relectance curve (G4) corresponds to the sheet disposed with a reflective film of 0.15 µm thick, the reflectance curve (G5) corresponds to the sheet disposed with a reflective film of 0.21 µm thick, and the reflectance curve (G6) corresponds to the sheet disposed with a reflective film thickness of 0.25 µm thick. The theoretical film thickness at 550 nm, the center of the visible wavelength region is $\lambda/(4n_1)$, i.e., 0.550÷4÷1.34= 0.1026 µm, represented by the curve (F) in FIG. 4 and by the curve (G) in FIG. 5.

Figure 2:
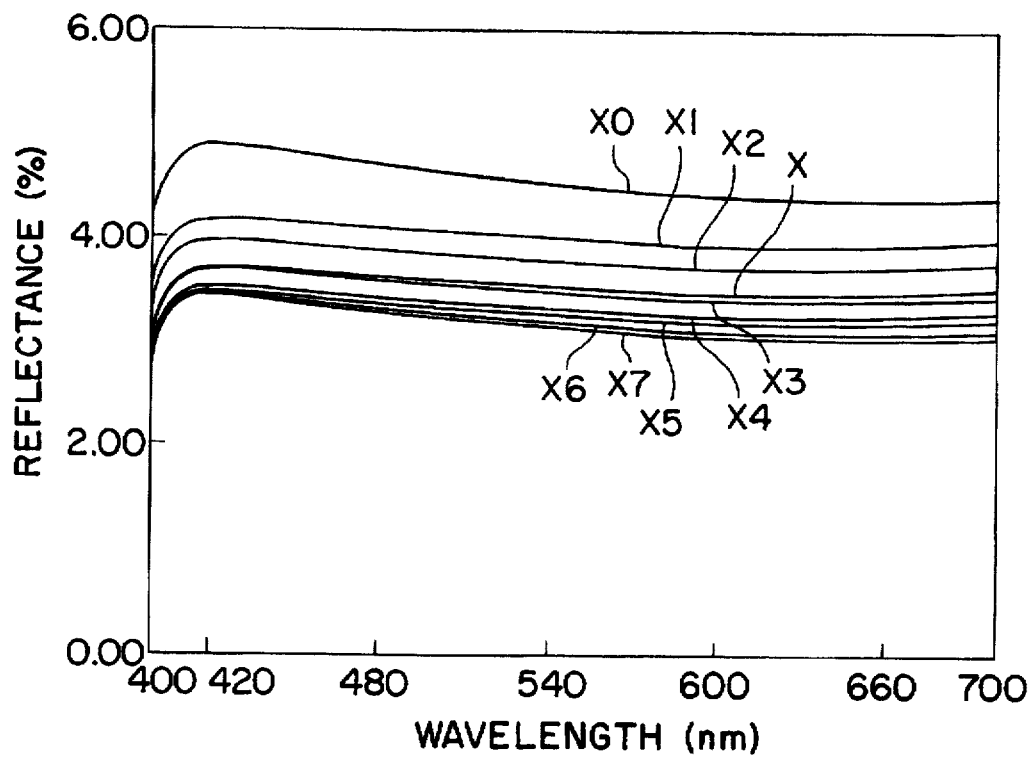
FIG. 2 is a graph showing the relationships between the thickness and the measured reflectance of an antireflective film as used in an optical sheet of the present invention.

However, in the case of a lenticular lens sheet with projections and depressions formed on the surface thereof to provide lenticular lenses, the optimal film thickness does not agree with the theoretical film thickness derived from the light interference theory, as explained before. FIG. 2 shows the measured reflectance curves of the sheet, wherein antireflective films of various thicknesses are disposed on the surface of a lenticular lens sheet substrate made of acrylic resin, for various wavelengths within the visible wavelength region. The thickness of the lenticular lens sheet substrate is about 1 mm.

In FIG. 2, the reflectance curve (x0) corresponds to the lenticular lens sheet substrate, the reflectance curve (x1) corresponds to the sheet disposed with a reflective film of 0.05 µm thick, the reflectance curve (x2) corresponds to the sheet disposed with a reflective film of 0.07 µm thick, the reflectance curve (x3) corresponds to the sheet disposed with a reflective film of 0.125 µm thick, the reflectance curve (x4) corresponds to the sheet disposed with a reflective film of 0.15 um thick, the reflectance curve (x5) corresponds to the sheet disposed with a reflective film of 0.21 um thick, the reflectance curve (x6) corresponds to the sheet disposed with a reflective film of 0.25 um thick and the reflectance curve (x7) corresponds to the sheet disposed with a reflective film of 0.30 um thick. The reflectance curve (x) corresponds to the sheet disposed with a reflective film of 0.10 um thick that is the theoretical thickness at the center visible wavelength, 550 nm.

The following is taught from FIG. 2.

The sheets disposed with antireflective films (x, x1 to x7) show lower reflectance than the sheet disposed with no reflective film (x0), thus resulting in an excellent antireflective effect. As the thickness of the antireflective film increases, the reflectance decreases, thus resulting in an excellent antireflective effect. The sheets (x4, x5, x6, x7) disposed with antireflective films having more than a 0.15 um thickness show reduced reflectance, resulting in a particularly excellent antireflective effect. In the case of a sheet disposed with an antireflective film of more than a 0.15 um thickness, there is little difference in reflectance with an increasing thickness of the antireflective film.

It is learned from the above features that a sheet disposed with an antireflective film, which has a film thickness different from the one theoretically derived, shows an excellent antireflective effect. It is also learned that the sheets disposed with reflective films, which have thicknesses ranging from about 1.2 to 5 times the optimal film thickness derived from the light interference theory, show a particularly excellent antireflective effect.

Figure 3:
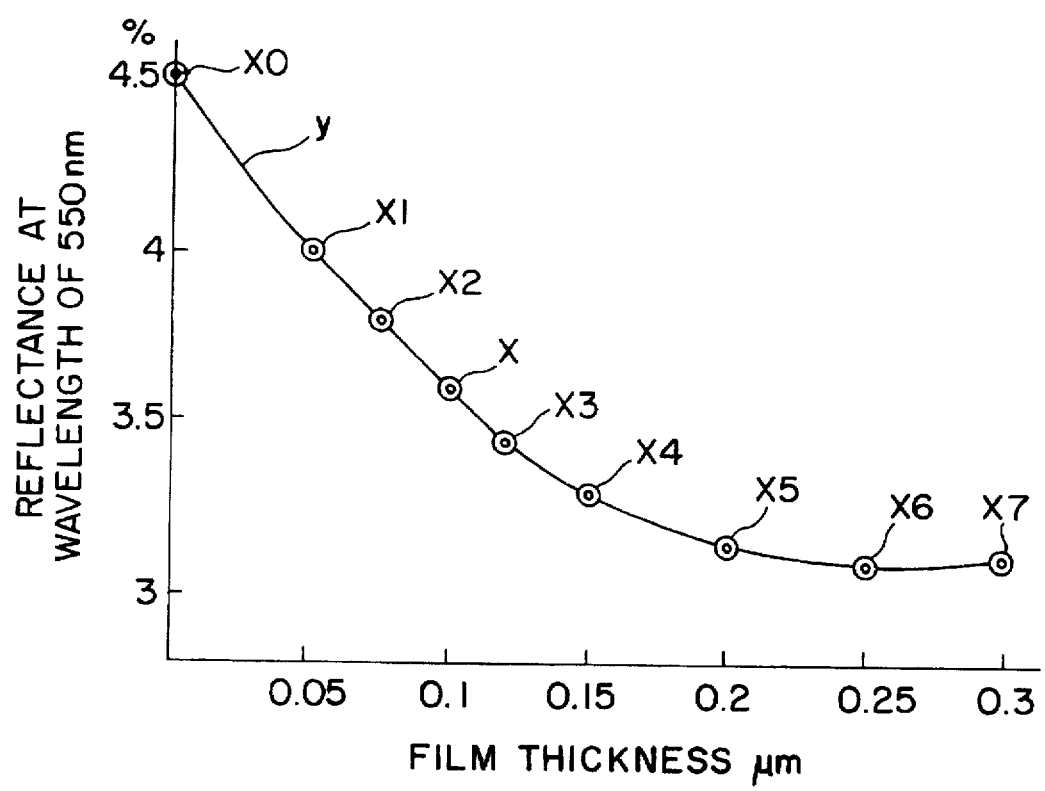
FIG. 3 is a graph showing the relationships between the thickness and the reflectance at a visible wavelength of 550 nm for an antireflective film as used in an optical sheet of the present invention.

FIG. 3 shows plots of reflectance at 550 nm, the central wavelength of the visible wavelength region, for each respective reflectance curve of FIG. 2, thereby obtaining an antireflective characteristics curve (y). It is observed in FIG. 3 that the reflectance does not change much with the film thickness increasing more than about 0.2 um. In other words, the reflectance of lenticular lens sheets disposed with an antireflective film with about 0.2 um or more in thickness stays almost at a constant value.

In addition, the results of measurements performed on lenticular lens sheets disposed with antireflective films of various thicknesses in terms of a variety of lens properties such as light collection characteristics, light diffusing characteristics, brightness irregularities, color uniformity, color changes or the like show that no deterioration in the foregoing lens properties were observed with the lenticular lens sheet disposed with antireflective films that do not exceed about 2 um in thickness. More specifically, the maximum thickness (about 2 um) of the antireflective film, wherein the antireflective effect is most enhanced, is about 20 times the film thickness (0.1 um) derived from the light interference theory. Moreover, when the production cost factor is taken into consideration, in addition to the foregoing discussions, a film thickness of 0.5 um or less for an antireflective film is desirable. An antireflective film of more than 0.5 um thick inclusive causes the production cost involved to become excessively high.

The foregoing test results show that the particularly desirable thickness for the antireflective film ranges from about 0.12 um to about 0.50 um. In other words, the particularly desirable thickness of the antireflective film ranges from $(1.2\lambda)/(4n_1)$ to $(5\lambda)/(4n_1)$.

With the optical sheet of the present invention, there are no particular restrictions imposed on the material used as the sheet substrate, and polycarbonate resin (refractory index of 1.59) or a copolymer (refractory index of 1.53 to 1.57) of acrylic resin and styrene resin may be used in addition to the acrylic resin described above.

The material for an antireflective film is a material having a refractory index smaller than that of the sheet substrate. A polymeric material is particularly desirable as the material for such antireflective films. There are no particular restrictions imposed on the polymeric material used for the antireflective film except for having a refractory index smaller than that of the sheet substrate, and denatured acrylic resin, denatured metacrylic resin, denatured polystyrene resin, denatured urethane resin, denatured epoxy resin and other denatured vinyl resin, may be used. With these lens sheets having the foregoing composition, the particularly desirable thickness of the antireflective films ranges from $(1.2\lambda)/(4n_1)$ to $(5\lambda)/(4n_1)$.

In the present example, there are no particular restrictions imposed on the thickness of the lenticular lens sheet substrate, and the thickness may range from about 0.3 mm to about 3 mm, for example. Also, a structure wherein an antireflective film is disposed on each respective surface of both sides of a lenticular lens sheet substrate is possible, and the same effect as the foregoing structure can be achieved.

EXAMPLE 2

Figure 6:
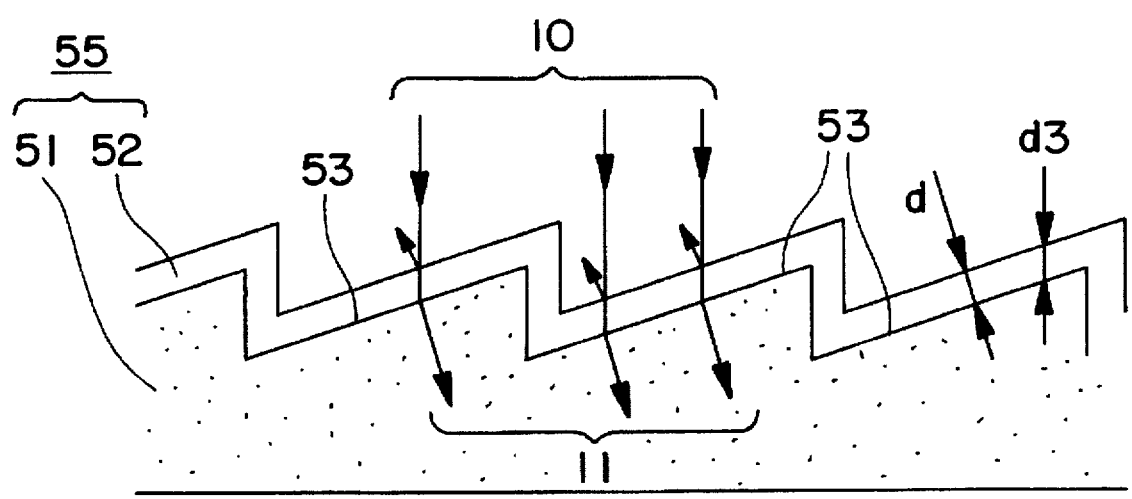
FIG. 6 is a cross-sectional view of a portion of a Fresnel lens sheet in an exemplary embodiment of the optical sheet of the present invention.

Next, an explanation will be made of a Fresnel lens sheet as an exemplary embodiment of the optical sheet of the present invention. FIG. 6 is a cross-sectional view of a portion of the Fresnel lens sheet in an exemplary embodiment of the optical sheet of the present invention. In FIG. 6, the Fresnel lens sheet 55 is comprised of a Fresnel sheet substrate 51 and an antireflective film 52 disposed on the surface of the Fresnel lens sheet substrate 51. The Fresnel lens sheet substrate 51 has a plurality of Fresnel lenses 53. The thickness of the antireflective film 52 is (d). The refractive index ($n_2$) of the foregoing antireflective film 52 is smaller than the refractive index of the material that composes the Fresnel lens sheet substrate 51. The light 10 vertically incident on the Fresnel lens sheet 55 passes through the antireflective film 52 in an oblique direction against the surface thereof and further passes through the Fresnel lens sheet substrate 51 obliquely to become transmissive light 11. In other words, the vertically incident light 10 travels the length (d3) in a slanting direction through the antireflective film 52.

Therefore, the thickness of the antireflective film 52 preferably ranges from $(1.2\lambda)/(4n_2)$ to $(5\lambda)/(4n_2)$ with the Fresnel lens sheet for the same reasons as described above in Example 1.

There are no particular restrictions imposed on the thickness of the Fresnel lens sheet substrate in the present example, but a typical thickness range of about 0.5 mm to 5 mm is used. A structure wherein the antireflective film is disposed on each respective surface of the Fresnel lens sheet substrate is also possible, resulting in the same effect as the foregoing structure.

EXAMPLE 3

Figure 7A:
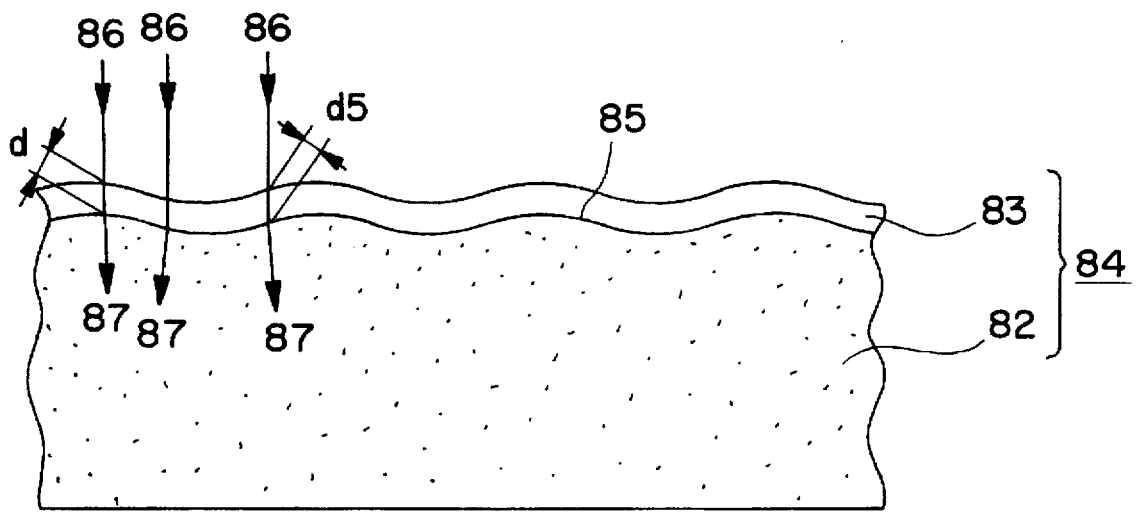
FIG. 7A is a cross-sectional view of a portion of a light diffusion panel in another exemplary embodiment of the optical sheet of the present invention.

Next, an explanation will be made on a light diffusion panel as an exemplary embodiment of the optical sheet of the present invention. FIG. 7A is a cross-sectional view of a portion of the light diffusion panel in an exemplary embodiment of the optical sheet of the present invention. In FIG. 7A, the light diffusion panel substrate 84 is comprised of a light diffusion panel substrate 82 and an antireflective film 83 disposed on the surface of the light diffusion panel substrate 82. The surface of the light diffusion panel substrate 82 has minute projections 85 and depressions formed by means of sand blasting and chemical processing. The thickness of the antireflective film 83 is (d).

The refractive index ($n_3$) of the antireflective film 83 is smaller than the refractive index of the material that composes the light diffusion panel substrate 82. The light 86 vertically incident on the light diffusion panel 84 passes through the antireflective film 83 in an oblique direction against the surface thereof and further passes through the light diffusion panel substrate 82 obliquely to become transmissive light 87. In other words, the vertically incident light 86 travels the length ($d_5$) in an oblique direction through the antireflective film 83.

Therefore, the thickness of the antireflective film 83 preferably ranges from $(1.2\lambda)/(4n_3)$ to $(5\lambda)/(4n_3)$ with the light diffusion panel for the same reasons as described in above Example 1.

There are no particular restrictions imposed on the thickness of the light diffusion panel substrate in the present example, but a typical thickness range of about 1 mm to 5 mm is used.

Some alternative structures can be employed for the light diffusion panel 84 as described below.

Figure 7B:
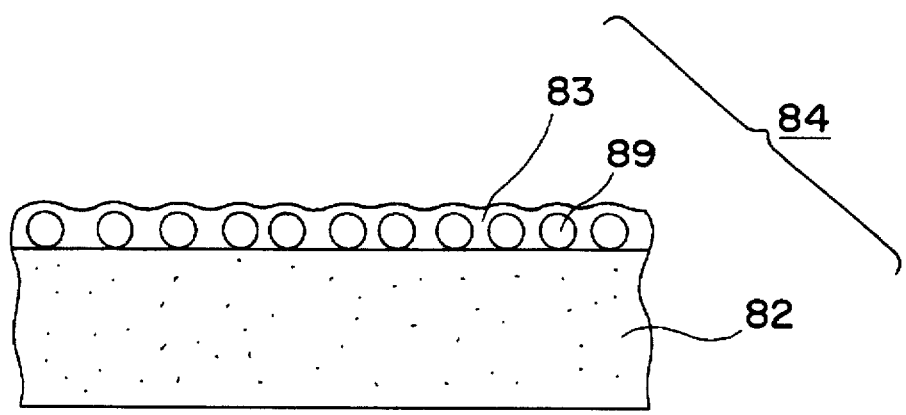
FIG. 7B is a cross-sectional view of a portion of another light diffusion panel in an above exemplary embodiment of the optical sheet of the present invention.

As illustrated in FIG. 7B, light diffusing powder 89 is disposed on the surface of the light diffusion panel substrate 82. The surface of the light diffusion panel material 82, after the disposition of the light diffusing powder 89, has projections and depressions according to the contour of the light diffusing powder 89. An antireflective film 83 is disposed on the foregoing surface having the projections and depressions.

Figure 7C:
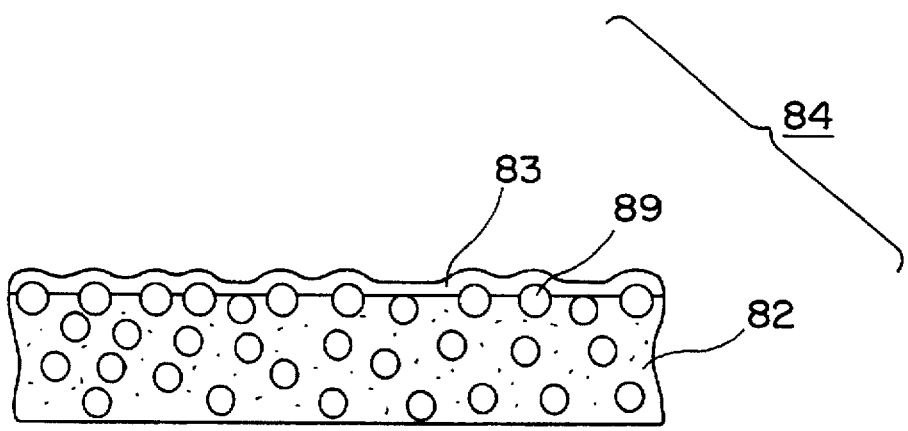
FIG. 7C is a cross-sectional view of a portion of still another light diffusion panel in an exemplary embodiment of the optical sheet of the present invention.

As illustrated in FIG. 7C, a light diffusion panel substrate 82 has light diffusing powder 89 contained therein. Part of the light diffusing powder 89 is exposed to the surface, thereby presenting projections and depressions on the surface of the light diffusion panel substrate 82 according to the contour o the exposed light diffusing powder 89. An antireflective film 83 is disposed on the surface of the foregoing projections and depressions.

Further, in the present example it is possible to employ a structure, wherein the antireflective film is disposed on each respective surface of both sides of the light diffusion panel substrate, resulting in the same effect as the foregoing structure.

EXAMPLE 4

Next, an explanation will be made of a light transmission screen using an optical sheet of the present invention.

Figure 8:
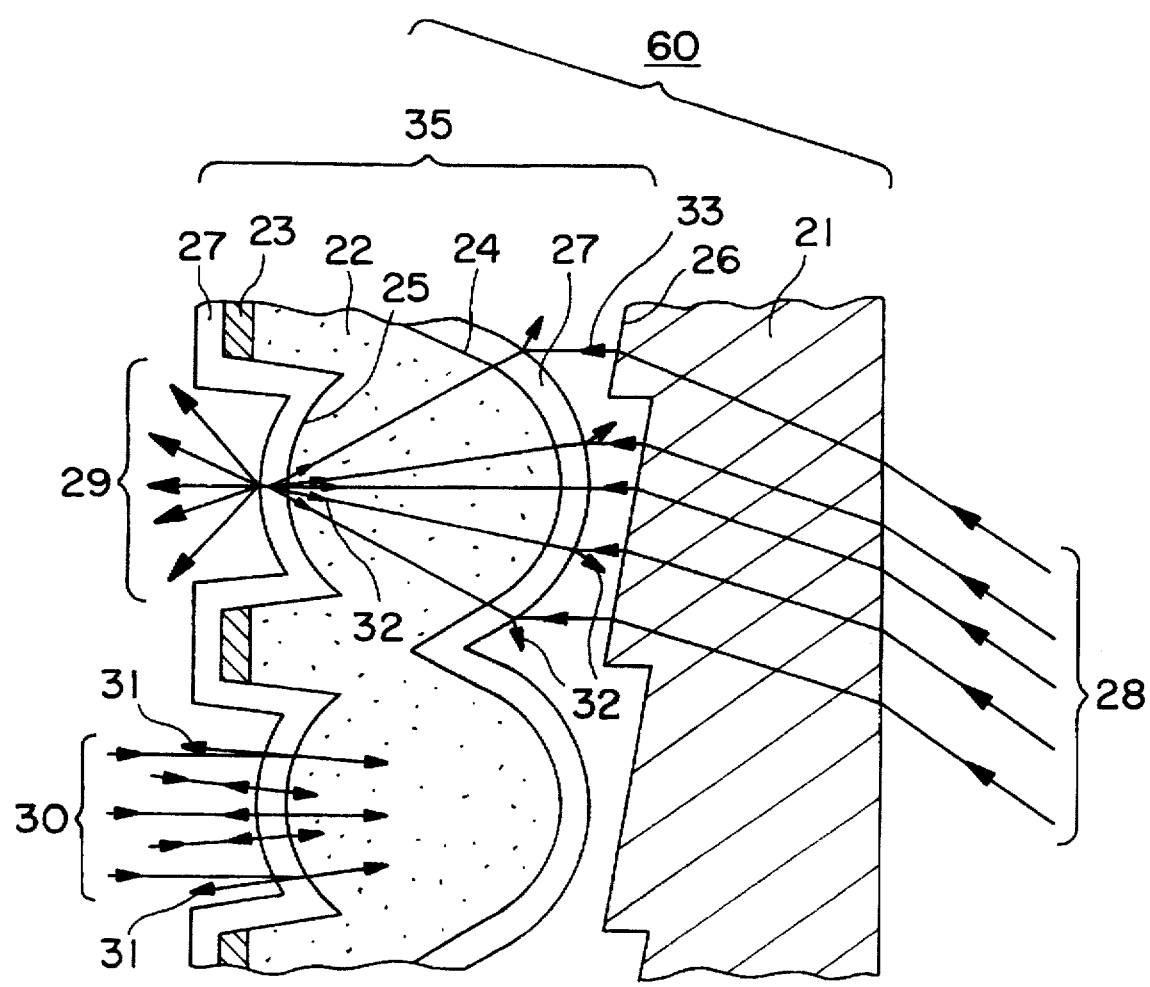
FIG. 8 is a cross-sectional view of a portion of a light transmission screen including an optical sheet of the present invention.

FIG. 8 is a cross-sectional view of a portion of an example of a light transmission screen using an optical sheet of the present invention. In FIG. 8, a light transmission screen 60 is comprised of a lenticular lens sheet 35 and a Fresnel lens sheet 21 arranged on the light incident side of the lenticular lens sheet 35. The lenticular lens sheet 35 is comprised of a lenticular lens sheet substrate 22 and antireflective films 27 disposed on both surfaces of the lenticular lens sheet substrate 22. The lenticular lens sheet substrate 22 comprises a plurality of light incident side lenses 24, a plurality of light radiant side lenses 25 and a plurality of black stripes 23. The Fresnel lens sheet 21 comprises a plurality of Fresnel lenses 26. The lenticular lens sheet substrate 22 and Fresnel lens sheet 21 are made of plastic materials such as acrylic resin and the like. The construction of the lenticular lens sheet 35 is the same as that of the lenticular lens sheet described in Example 1.

The thickness of the antireflective film 27 is ranges from $(1.2\lambda)/4n_1)$ to $(5\lambda)/(4n_1)$.

The material for the antireflective film is a polymeric material as described in Example 1. In the present example, a polymeric material sold under the brand name CYTOP was used as the material for the antireflective film and a dipping method was used to form the antireflective film. The thickness of the antireflective film was adjusted to range from 0.12 μm to 0.5 μm by controlling the concentration of the polymeric material and the speed of removing the substrate from the dipping bath.

In the light transmission screen shown in FIG. 8, the incident light 28 from a CRT enters into the Fresnel lens sheet 21 and becomes vertical light 32 through the Fresnel lens 26.

The vertical light 32 enters into the incident light side lens 24 of the lenticular lens sheet 35 and focuses on the surface of the light radiant side lens 25. The focused radiant light 29 is received at the eyes of a viewer.

At this time, reflected light 32 is produced on the surfaces of the light incident side lens 24 and light radiant side lens 25 of the lenticular lens sheet 35. In order to reduce the foregoing reflected light 32, an antireflective film 27 is disposed on the surfaces of the light incident side lens 24 and light radiant side lens 25 of the lenticular lens sheet substrate 22.

As clearly observed in FIG. 3, while the reflectance of the lenticular lens sheet substrate 22 is 4.5% at a visible wavelength of 550 nm (see the point (x0) in FIG. 3), the reflectance of an antireflective film formed to a thickness derived from the conventional light interference theory is 3.6%. (See the point (x) in FIG. 3).

The reflectance in the present example is as low as 3.1%. (See (x5) of FIG. 3). In other words, the reflectance characteristics are improved by about 14% when compared with the prior art, thereby contributing to enhancement in light transmissivity. As a result, when incident light 28 from a CRT becomes radiant light 29, reflectance is improved by about 14% and screen brightness is enhanced.

When ambient light 30 is incident on the screen surface from the viewer's side, reflective light 31 is produced. Since there is an antireflective film 27 in place, reflection of the ambient light is reduced and the ambient light reflectance is improved. In other words, the contrast between the radiant light 29 and the ambient light 30 has been improved by 14%.

With the present example, it is also possible to employ a structure wherein an antireflective film of Example 2 is disposed on the surface of the Fresnel lens sheet 21 instead of the antireflective film 27 being disposed on the surface of the lenticular lens sheet substrate 22. In this case, a light transmission screen of higher light transmissivity is realized.

Figure 11:
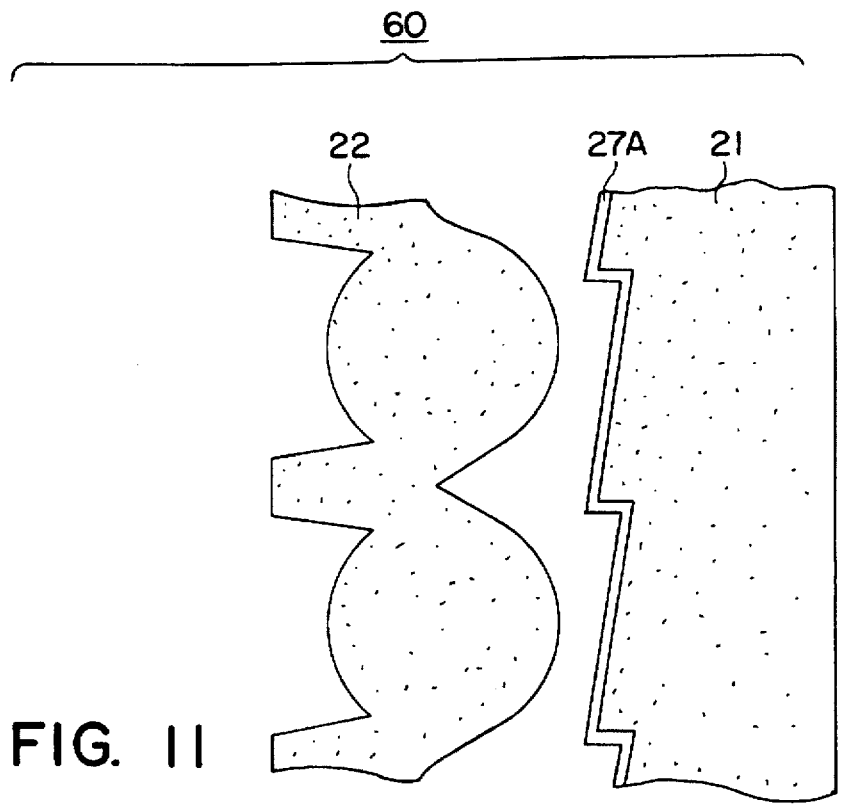
FIGS. 11–16 are each a cross-sectional view of a portion of a light transmission screen including an optical sheet in accordance with a further respective embodiment of the present invention.

FIG. 11 is a cross-sectional view of a portion of a further example of a light transmission screen using an optical sheet of the present invention. FIG. 11 is similar to FIG. 8, however, instead of the antireflective film 27 being disposed on the surface of the lenticular lens sheet substrate 22, now antireflective film 27A is disposed on the surface of the Fresnel lens sheet 21.

Although a structure wherein an antireflective film 27 was disposed on the surface of a lenticular lens sheet substrate 22 has been explained in the present example, it is also possible to have an antireflective film disposed on the surface of a Fresnel lens sheet 21 as described in Example 2. A light transmission screen with an antireflective film thus disposed on each respective surface of lenticular lens sheet and Fresnel lens sheet can realize improved light transmissivity and ambient light reflectance.

Figure 12:
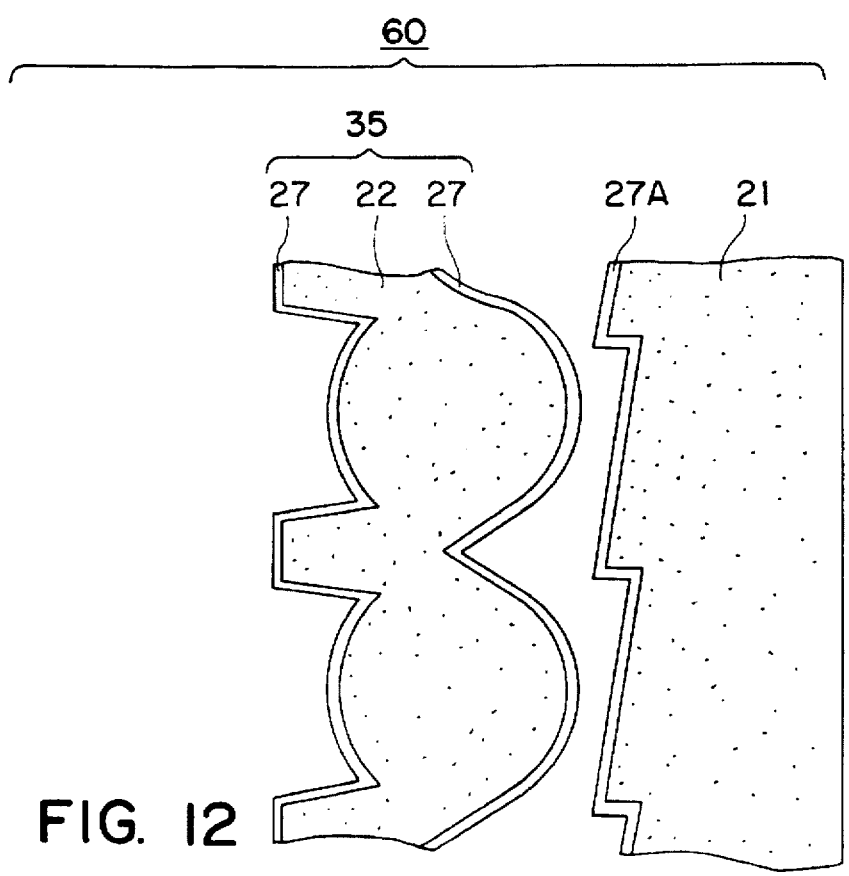

FIG. 12 is a cross-sectional view of a further example of a light transmission screen using an optical sheet of the present invention. FIG. 12 is similar to FIG. 8, however, instead of an antireflective film being disposed on only the surface of the lenticular lens sheet substrate, an additional antireflective film 27A is disposed on the Fresnel lens sheet.

EXAMPLE 5

Next, an explanation will be made of a light transmission screen using a lens sheet and a light diffusion panel which are exemplary embodiments of an optical sheet of the present invention.

Figure 9:
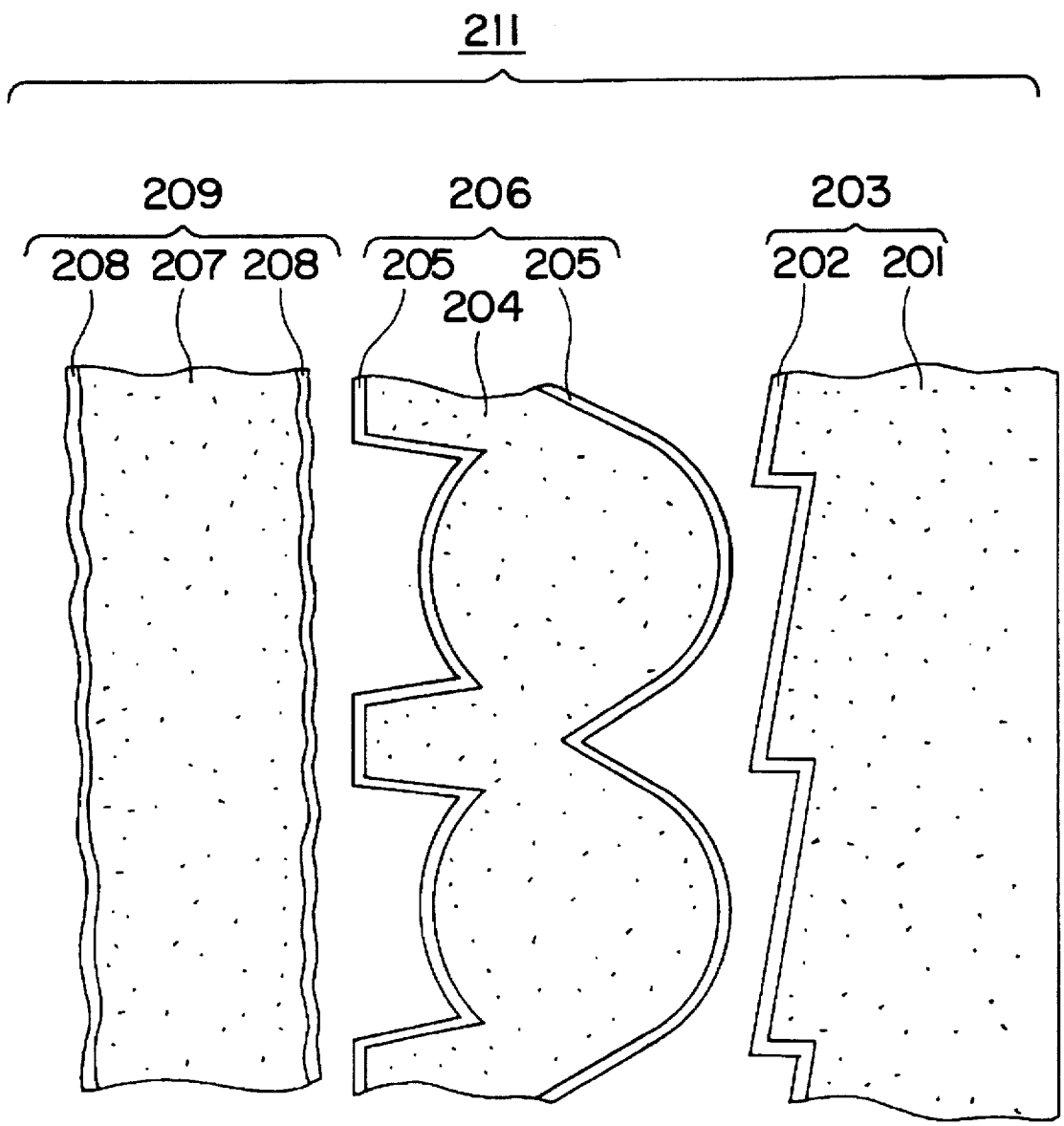
FIG. 9 is a cross-sectional view of a portion of another light transmission screen including an optical sheet of the present invention.
Figure 10:
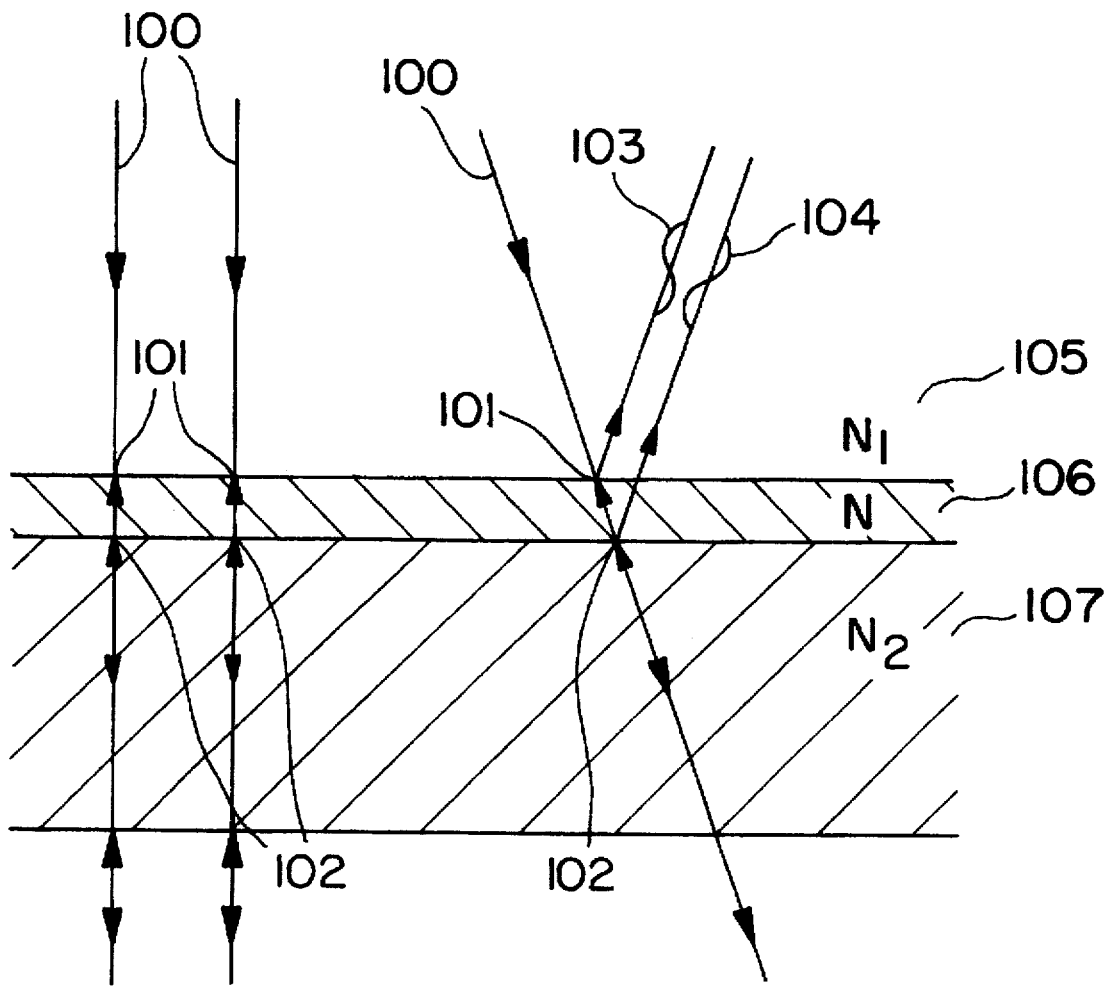
FIG. 10 is a cross-sectional view of a portion of a structure including an antireflective film designed according to the conventional light inference theory disposed on the surface of a planar plate with a flat surface.

FIG. 9 is a cross-sectional view of a portion of a light transmission screen using an optical sheet of the present invention.

In FIG. 9, a light transmission screen 211 is comprised of a lenticular lens sheet 206, a Fresnel lens sheet 203 arranged on the light incident side of the lenticular lens sheet 206 and a light diffusion panel 209 arranged on the light radiant side of the lenticular lens sheet 206. The lenticular lens sheet 206 comprises a lenticular lens sheet substrate 204 and antireflective films 205 disposed on both surfaces of the lenticular lens sheet substrate 204 as described in Example 1.

The Fresnel lens sheet 203 is comprised of a Fresnel lens sheet substrate 201 and an antireflective film 202 disposed on the light radiant side surface of the Fresnel lens sheet substrate 201 as described in Example 2. The light diffusion panel 209 is comprised of a light diffusion panel substrate 207 and antireflective films 208 disposed on both surfaces of the light diffusion panel substrate 207 as described in Example 3.

In the light transmission screen of the foregoing structures, light transmissivity is remarkably improved and ambient light reflectance is greatly reduced. As a result, the screen brightness is much more enhanced and the ambient light reflection at the screen surface is much more reduced.

An arbitrary combination of the antireflective films to be disposed on the surfaces of lens sheet or diffusion panel can be used with the present Example 5. For example, a structure wherein an antireflective film is disposed on the surface of only one side of a light diffusion panel susbtrate is possible. Also possible is a structure wherein an antireflective film is disposed on the surface of only one side of a lenticular lens sheet substrate. It is also possible to employ a structure wherein an antireflective film is disposed on the surface of only one side of a Fresnel lens sheet substrate. A screen with improved brightness can be realized by the foregoing structures.

Figure 13:
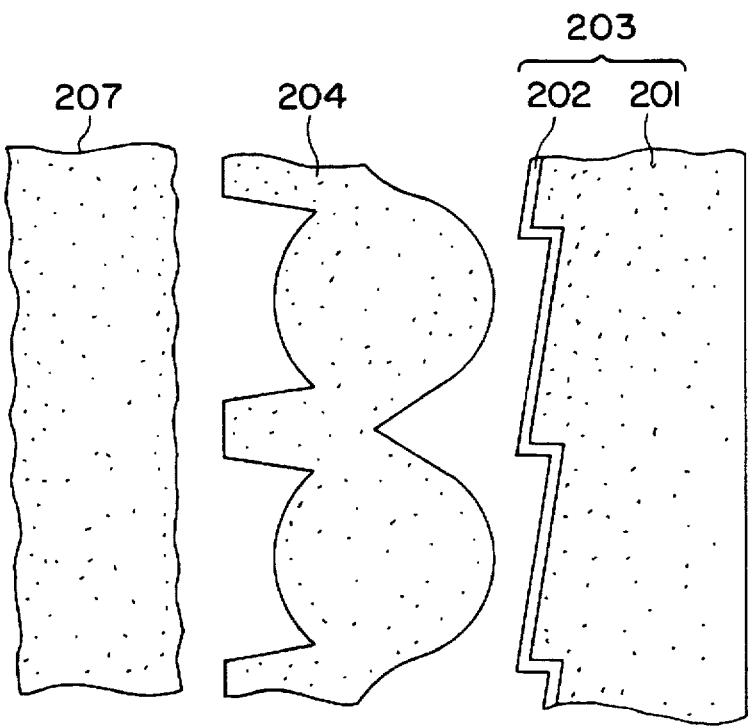

FIG. 13 is similar to FIG. 9. However, in this exemplary embodiment, antireflective film 205 and 208 are not used.

Figure 14:
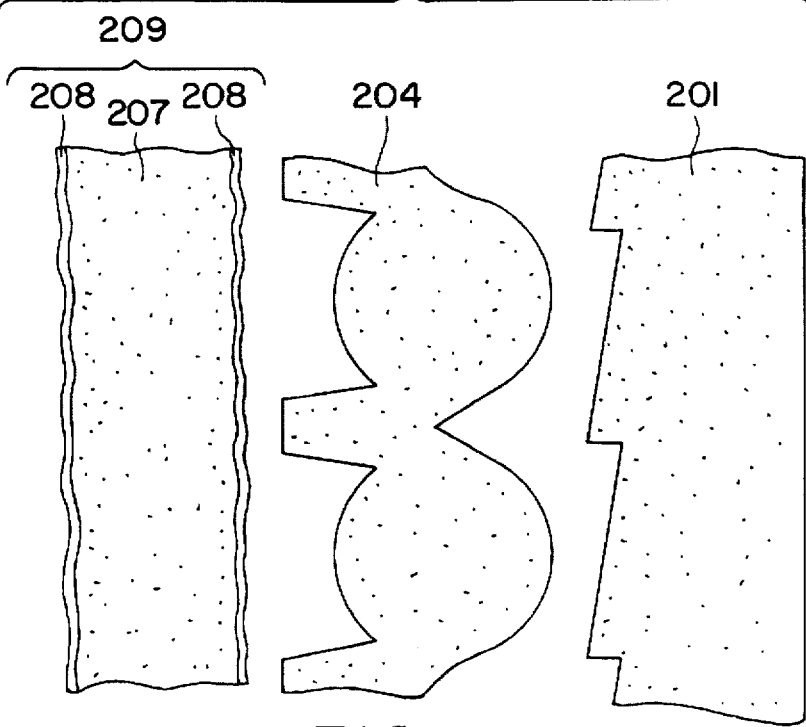

FIG. 14 is similar to FIG. 9. However, in this exemplary embodiment, antireflective film 202 and 205 are not used.

Figure 15:
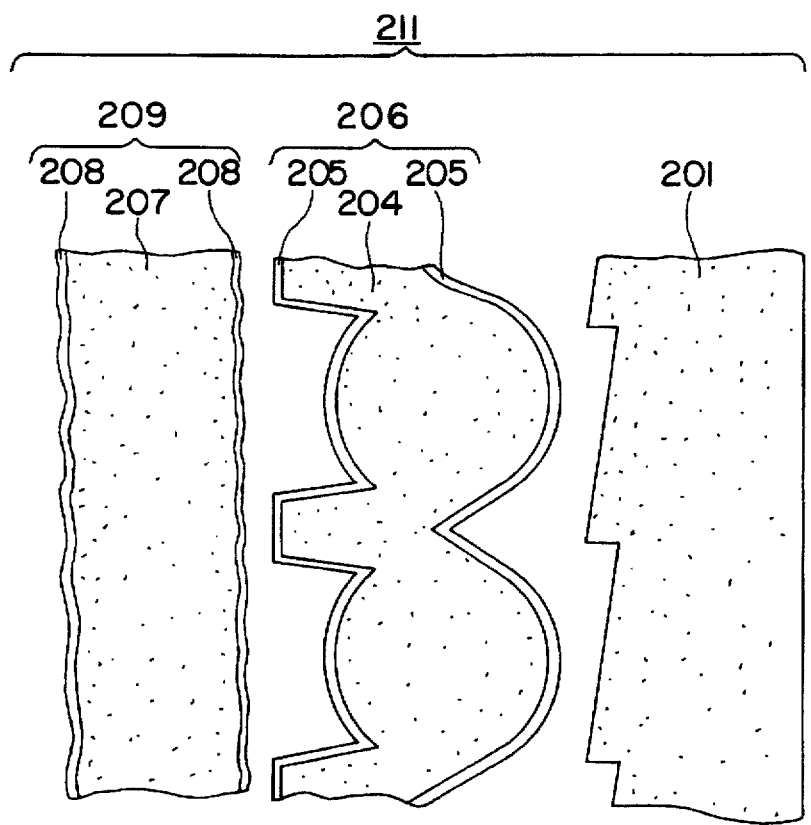

FIG. 15 is similar to FIG. 9. However, in this exemplary embodiment, antireflective film 202 is not used.

Figure 16:
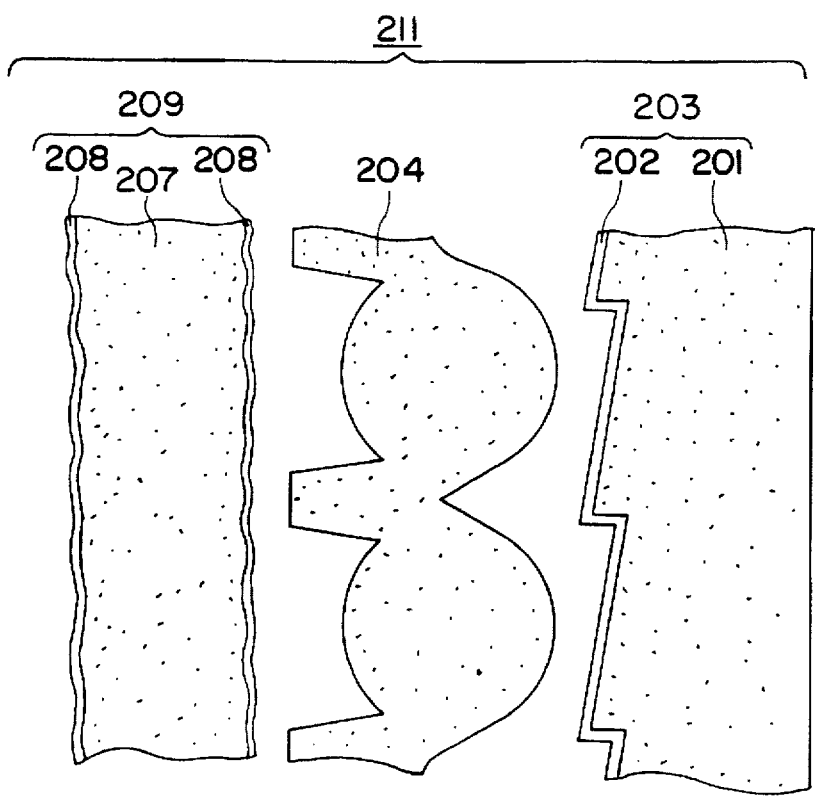

FIG. 16 is similar to FIG. 9. However, in this exemplary embodiment, antireflective film 205 is not used.

It is clear that a variety of modified examples other than the foregoing examples are possible within the present invention. For example, an optical sheet of the present invention can be used as a light diffusion panel for a liquid crystal display. Also, an optical sheet of the present invention can be used in a lens sheet comprising groups of lenses, each of which has an arbitrary shape, a sheet or panel having projections and depressions on the surface, and the like. With these structures, the same effect as the foregoing examples can be achieved. Therefore, all variations that are within the true spirit and scope of the present invention should be deemed to be included in the following claims.

What is claimed:

1. An optical sheet comprising a sheet-like substrate with projections and depressions on a surface thereof and an antireflective film disposed on said surface of said sheet-like substrate, wherein a thickness of said antireflective film ranges from $(1.2\lambda)/(4n)$ to $(5\lambda)/(4n)$, where n is a refractory index of said antireflective film and n is smaller than a refractive index of said sheet-like substrate and $\lambda$ is a wavelength of light in a visible region.

2. An optical sheet according to claim 1, wherein said antireflective film is made of a polymer material.

3. An optical sheet comprising:

a lenticular lens sheet substrate having a plurality of lenticular lenses, and an antireflective film disposed on a surface of said lenticular lens sheet substrate, wherein said antireflective film has a refractory index ($n_1$) that is smatter than a refractory index of said lenticular lens sheet substrate and a thickness of said antireflective film ranges from $(1.2\lambda)/(4n_1)$ to $(5\lambda)/(4n_1)$ derived from a light interference theory, where a wavelength of light in a visible region is ($\lambda$).

4. An optical sheet according to claim 3, wherein said antireflective film is made of a polymer material.

5. An optical sheet comprising:

a Fresnel lens sheet substrate having a plurality of Fresnel lenses, and an antireflective film disposed on a surface of said Fresnel lens sheet substrate, wherein said antireflective film has a refractory index ($n_2$) that is smaller than a refractory index of said Fresnel lens sheet substrate, and the thickness of said antireflective film ranges from $(1.2\lambda)/(4n_2)$ to $(5\lambda)/(4n_2)$, where $\lambda$ is a wavelength of light in a visible region.

6. An optical sheet according to claim 5, wherein said antireflective film is made of a polymer material.

7. An optical sheet comprising:

a light diffusion panel substrate having a plurality of projections and depressions on a surface thereof, and an antireflective film disposed on the surface of said light diffusion panel substrate, wherein said antireflective film has a refractory index $n_3$ that is smaller than a refractory index of said light diffusion panel substrate, and a thickness of said antireflective film ranges from $(1.2\lambda)/(4n_3)$ to $(5\lambda)/(4n_3)$, where $\lambda$ is a wavelength of light in a visible region.

8. An optical sheet according to claim 7, wherein said antireflective film is made of a polymer material.

9. A light transmission screen comprising:

a Fresnel lens sheet; and a lenticular lens sheet positioned on a light radiant side of said Fresnel lens sheet, said lenticular lens sheet comprising a lenticular lens sheet substrate having a plurality of lenticular lenses and an antireflective film disposed on a surface of said lenticular lens sheet substrate, wherein said antireflective film has a refractory index ($n_1$) that is smaller than a refractory index of said lenticular lens sheet substrate, and a thickness of said antireflective film ranges from $(1.2\lambda)/(4n_1)$ to $(5\lambda)/(4n_1)$, where $\lambda$ is a wavelength of light in the visible region.

10. A light transmission screen according to claim 9, further comprising a light diffusion panel positioned on a light radiant side of said lenticular lens sheet.

11. A light transmission screen comprising:

a lenticular lens sheet; and a Fresnel lens sheet positioned on the light incident side of said lenticular lens sheet, said Fresnel lens sheet comprising a Fresnel lens sheet substrate having a plurality of Fresnel lenses and an antireflective film disposed on a surface of said Fresnel lens sheet substrate, wherein said antireflective film has a refractory index ($n_2$) that is smaller than a refractory index of said Fresnel lens sheet substrate, and a thickness of said antireflective film ranges from $(1.2\lambda)/(4n_2)$ to $(5\lambda)/(4n_2)$, where $\lambda$ is a wavelength of light in a visible screen.

12. A light transmission screen according to claim 11, further comprising a light diffusion panel positioned on a light radiant side of said lenticular lens sheet.

13. A light transmission screen for use with light having a wavelength ($\lambda$) comprising:

a lenticular lens sheet comprising a lenticular lens sheet substrate with a plurality of lenticular lenses and a first antireflective film disposed on a surface of said lenticular lens sheet substrate, wherein said first antireflective film has a refractory index ($n_1$) smaller than a refractory index of said lenticular lens sheet substrate and a thickness of said first antireflective film ranges from $(1.2\lambda)/(4n_1)$ to $(5\lambda)/(4n_1)$, where is ($\lambda$) a wavelength of light; and a Fresnel lens sheet positioned on a light incident side of said lenticular lens sheet, said Fresnel lens sheet comprising a Fresnel lens sheet substrate with a plurality of Fresnel lenses and a second antireflective film disposed on a surface of said Fresnel lens sheet substrate wherein said second antireflective film has a refractory index ($n_2$) that is smaller than a refractory index of said Fresnel lens sheet substrate and a thickness of said second antireflective film ranges from $(1.2\lambda)/(4n_2)$ to $(5\lambda)/(4n_2)$.

14. A light transmission screen according to claim 13, further comprising a light diffusion panel positioned on a light radiant side of said lenticular lens sheet.

15. A light transmission screen comprising:

a lenticular lens sheet;

a Fresnel lens sheet positioned on a light incident side of said lenticular lens sheet; and a light diffusion panel positioned on a light radiant side of said lenticular lens sheets, said light diffusion panel comprising a light diffusion panel substrate with a plurality of projections and depressions formed on a surface thereof and an antireflective film which is disposed on the surface of said light diffusion panel substrate, wherein said antireflective has a refractory index ($n_3$) smaller than a refractory index of said lenticular lens sheet substrate and a thickness of said antireflective film ranges from $(1.2\lambda)/(4n_3)$ to $(5\lambda)/(4n_3)$, where ($\lambda$) is a wavelength of light in a visible region.

16. A light transmission screen according to claim 15, wherein said lenticular lens sheet comprises a lenticular lens sheet substrate with a plurality of lenticular lenses and a second antireflective film disposed on a surface of said lenticular lens sheet substrate, wherein said second antireflective film has a refractory index ($n_1$) smaller than a refractory index of said lenticular lens sheet substrate and a thickness of said second antireflective film ranges from $(1.2\lambda)/(4n_1)$ to $(5\lambda)/(4n_1)$.

17. A light transmission screen according to claim 15, wherein said Fresnel lens sheet comprises a Fresnel lens sheet substrate with a plurality of Fresnel lenses and a third antireflective film disposed on a surface of said Fresnel lens sheet substrate, wherein said third antireflective film has a refractory index ($n_2$) smaller than a refractory index of said Fresnel lens sheet substrate and a thickness of said third antireflective film ranges from $(1.2\lambda)/(4n_2)$ to $(5\lambda)/(4n_2)$.

18. A light transmission screen comprising:

a lenticular lens sheet comprising a lenticular lens sheet substrate with a plurality of lenticular lenses and a first antireflective film disposed on a surface of said lenticular lens sheet substrate, wherein said first antireflective film has a refractory index ($n_1$) and a thickness of said first antireflective film ranges from $(1.2\lambda)/(4n_1)$ to $(5\lambda)/(4n_1)$, where ($\lambda$) is a wavelength of light in a visible region;

a Fresnel lens sheet positioned on a light incident side of said lenticular lens sheet, said Fresnel lens sheet comprising a Fresnel lens sheet substrate with a plurality of Fresnel lenses and a second antireflective film disposed on a surface of said Fresnel lens sheet substrate, wherein said second antireflective film has a refractory index ($n_2$) that is smaller than a refractory index of said Fresnel lens sheet substrate and a thickness of said second antireflective film ranges from $(1.2\lambda)/(4n_2)$ to $(5\lambda)/(4n_2)$; and a light diffusion panel positioned on a light radiant side of said lenticular lens sheets, said light diffusion panel comprising a light diffusion panel substrate with a plurality of projections and depressions formed on a surface thereof and a third antireflective film disposed on a surface of said light diffusion panel substrate and characterized by having a refractory index ($n_3$) smaller than a refractory index of said lenticular lens sheet substrate, and a thickness of said third antireflective film ranges from $(1.2\lambda)/(4n_3)$ to $(5\lambda)/(4n_3)$.

* * * * *